United States Patent
Kanehara et al.

(10) Patent No.: US 9,339,932 B2
(45) Date of Patent: May 17, 2016

(54) TEACHING POINT PROGRAM SELECTION METHOD FOR ROBOT SIMULATOR

(71) Applicant: Fanuc America Corporation, Rochester Hills, MI (US)

(72) Inventors: Takeyoshi Kanehara, Lake Orion, MI (US); Dave O'Toole, Fenton, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 0 days.

(21) Appl. No.: 14/079,886

(22) Filed: Nov. 14, 2013

(65) Prior Publication Data

US 2014/0135986 A1 May 15, 2014

Related U.S. Application Data

(60) Provisional application No. 61/726,263, filed on Nov. 14, 2012.

(51) Int. Cl.
*B25J 9/16* (2006.01)

(52) U.S. Cl.
CPC ..... *B25J 9/1671* (2013.01); *G05B 2219/45065* (2013.01)

(58) Field of Classification Search
CPC ............... G05B 19/41885; G05B 2219/40314; G05B 19/4069; G05B 2219/32351; G05B 2219/35343; G05B 2219/37056; B25J 9/1671; B25J 9/1664
See application file for complete search history.

(56) References Cited

U.S. PATENT DOCUMENTS

| | | | | |
|---|---|---|---|---|
| 5,479,078 A | * | 12/1995 | Karakama et al. | 318/568.13 |
| 5,574,835 A | * | 11/1996 | Duluk et al. | 345/421 |
| 5,937,143 A | * | 8/1999 | Watanabe et al. | 700/264 |
| 5,977,978 A | * | 11/1999 | Carey et al. | 345/419 |
| 6,167,328 A | * | 12/2000 | Takaoka et al. | 700/264 |
| 6,597,967 B2 | * | 7/2003 | Xi et al. | 700/184 |
| 2004/0019407 A1 | * | 1/2004 | Greene et al. | 700/245 |
| 2009/0299526 A1 | * | 12/2009 | Ditscher et al. | 700/264 |
| 2012/0029700 A1 | * | 2/2012 | Eickhorst | 700/264 |

* cited by examiner

*Primary Examiner* — Khoi Tran
*Assistant Examiner* — Ryan Rink
(74) *Attorney, Agent, or Firm* — Fraser Clemens Martin & Miller LLC; William J. Clemens

(57) ABSTRACT

A method of selecting a teaching point program in a three-dimensional graphical representation of a workcell includes the steps of generating the three-dimensional graphical representation of the workcell, calculating a three-dimensional boundary box for each teaching point program associated with the workcell, converting each boundary box to a two-dimensional boundary area, and recognizing which boundary areas overlap a selected area drawn over a two-dimensional display screen. Each boundary area that has been recognized as overlapping the selected area is identified to a user and presented in a list if multiple candidate boundary areas are recognized and identified. The user may then edit those teaching point programs identified as being associated with the selected area.

20 Claims, 5 Drawing Sheets

TEACHING POINT PROGRAM SELECTION METHOD FOR ROBOT SIMULATOR

CROSS-REFERENCE TO RELATED APPLICATIONS

This application claims priority to U.S. Provisional Application Ser. No. 61/726,263, filed Nov. 14, 2012, the entire disclosure of which is hereby incorporated herein by reference.

FIELD OF THE INVENTION

This invention relates to a method of selecting a teaching point program based upon a position a robotic path thereof in a three-dimensional (3-D) graphical representation of a workcell generated by a robot simulator.

BACKGROUND OF THE INVENTION

In a robotic painting application, there may be hundreds of different teaching point (TP) programs on multiple robot controllers that handle the painting of a single vehicle. For instance, each TP program may cause a paint applicator disposed on a robot arm to follow a specified path and assume a specified orientation in order to properly apply paint to the vehicle. If there is an area on a vehicle that is not getting painted properly, finding the correct TP program, the correct taught points associated with the TP program, and the correct application instructions to properly paint the area at issue can be very difficult and time consuming, especially for non-expert users of the robotic system performing the painting application. This is very inefficient in a production environment.

Graphical offline programming solutions have been developed to simplify the process of teaching a robotic path for executing a specified robotic application, such as the painting application discussed hereinabove. Such software products generate and display a 3-D space for simulating a robotic process to be carried out therein. The simulation of the robotic process may include generating each TP program associated with the robotic process within the 3-D space in the form of a 3-D path or line to be followed by a robotic component. The generated 3-D path may be visually displayed to a user of the software product or the 3-D path may be hidden from view. If shown visually, each TP program may further be represented in the form of all of the taught points, or nodes, that comprise the 3-D path. Because the 3-D space is presented to a user of the software product on a two-dimensional (2-D) display screen, such software products are often equipped with a user interface (UI) that allows a user to change a position and posture from which the 3-D space is viewed, effectively changing a "camera view" displayed on the 2-D display screen. The camera view displayed on the 2-D display screen is essentially a 2-D projection of the 3-D space in the form of an image.

A single painting application may include the use of multiple robots, and each robot may be responsible for carrying out hundreds of TP programs. Each TP program, in turn, may be comprised of hundreds of taught points (nodes). The high number of TP programs and associated taught points makes displaying graphical representations of each TP program undesirable. The generating of a graphical representation of each TP program and associated taught points is time consuming and cumbersome from a computational standpoint. Furthermore, the high number of TP programs used to program a single robotic application leads to many TP programs and associated taught points being represented as overlapping or closely spaced, making identification of a specified TP program in a display increasingly difficult. For these reasons, many software products do not display the graphical representation of each and every TP program when the user navigates the 3-D space representing the workcell. Instead, these software products require the user to identify which TP programs are to be represented graphically before selecting a specified TP program for editing.

In order to identify and select a specified TP program, the user of the software product may utilize the UI to place a desired region of the 3-D space having the specified TP program represented therein within the view of the 2-D display screen. The user then uses a cursor to select a region of the 3-D space projected to the 2-D display screen where the specified TP program path is located, or believed to be located. For instance, if a door of a vehicle is not being painted properly, the user would navigate the 3-D space to place the vehicle door within the view of the 2-D display screen. The user then "rubber bands" the problem area on the vehicle door as projected and shown on the 2-D display screen. The "rubber banding" of the selected area is usually performed by drawing a rectangular box over the 2-D display screen. Once a region is selected on the 2-D display screen, the software product may then identify and display each taught point associated with each TP program path located within the selected region. The taught points are located in the 3-D space and must be projected to the 2-D display screen. A calculation is done to filter the points and choose those points that are located within the user selected screen area.

As explained hereinabove, the number of taught points comprising the TP programs within the selected region may be in the hundreds or greater. Accordingly, the time needed to identify and display each taught point within the selected region may be excessive due to the sheer number of computations needed. Furthermore, displaying each taught point located within the selected area often creates a "cloud" of overlapping or closely spaced taught points, making identification of a specific TP program or taught point very difficult. The excessive number of computations needed to display the taught points in this manner has caused existing software products to be limited to identifying a single TP program at a time or only those TP programs associated with a selected robot controller. Otherwise, the user would experience unexpected delays, leading to excessive expense, lost time, and potentially frustration of the user.

It would therefore be desirable to provide a method of selecting a TP program within a 3-D space generated by a robot simulator that provides a user interface that allows for selection of a specific area projected to a 2-D display screen, that automatically identifies and selects those TP programs associated with the area selected on the 2-D display screen in a time efficient manner, and that allows for the identification and selection of multiple TP programs assigned to multiple robot controllers associated with the robotic application.

SUMMARY OF THE INVENTION

In concordance with the instant disclosure, an efficient and cost effective method for selecting a specified TP program within a 3-D space generated by a robot simulator is surprisingly discovered.

In one embodiment, a method for locating at least one TP program for editing according to the invention is disclosed. The method comprises the steps of: generating a 3-D graphical representation of a robotic process to be performed in a workcell according to at least one TP program associated with the workcell; selecting a 2-D selection area superimposed on the 3-D graphical representation; identifying the at least one TP program associated with the 2-D selection area to a user; and permitting user editing of at least a portion of the at least one identified TP program associated with the 2-D selection area.

In a further embodiment, a method of selecting at least one TP program within a 3-D graphical representation of a workcell according to the invention is disclosed. The method comprises the following steps: pre-calculating a 3-D boundary box for each of the TP programs associated with the workcell; converting each of the 3-D boundary boxes to a corresponding 2-D boundary area superimposed on the 3-D graphical representation of the workcell; selecting a 2-D selection area superimposed on the 3-D graphical representation of the workcell; recognizing each 2-D boundary area that is at least one of overlapping the 2-D selection area and within a distance tolerance of the 2-D selection area; and identifying to a user each TP program having a corresponding 2-D boundary area that is recognized as being at least one of overlapping the 2-D selection area and within the distance tolerance of the 2-D selection area.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
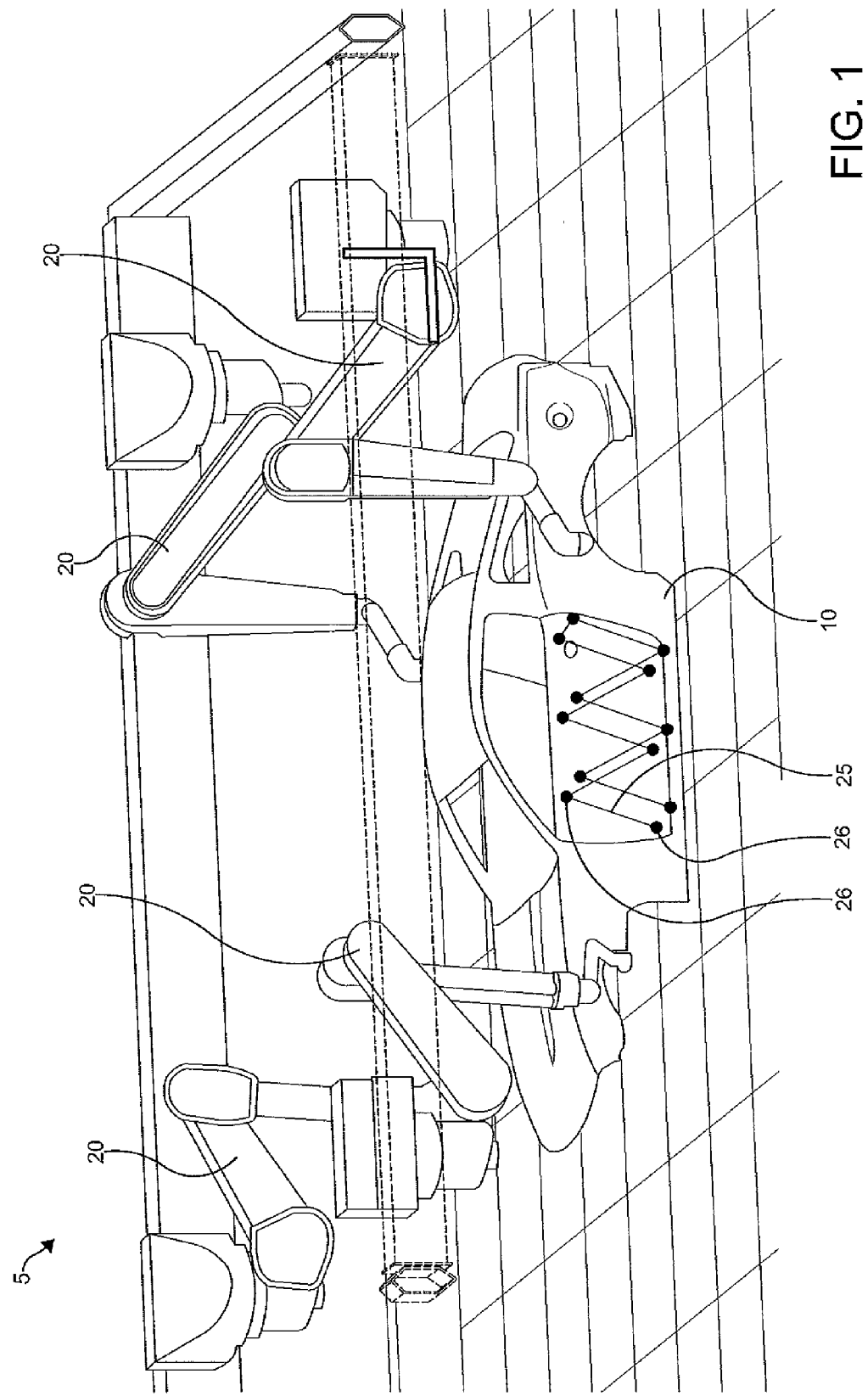
FIG. 1 is a perspective view of a 3-D graphical representation of a workcell including a vehicle body and a plurality of robots according to an embodiment of the invention.

FIG. 1 shows a 3-D graphical representation of a workcell 5 including a vehicle body 10 and a plurality of robots 20. The workcell 5 is located within a 3-D space used to simulate a robotic process. The 3-D space refers to a space where a position of a point may be defined with reference to a traditional Cartesian coordinate system having three orthogonal axes, meaning that each point within the 3-D space can be defined by three coordinate values relative to a reference point (origin) located within the 3-D space.

The robots 20 shown in FIG. 1 are configured to perform a painting process on the vehicle body 10, however, the workcell 5 may include robots 20 configured to perform any robotic process, including but not limited to painting, welding, picking-and-placing, assembling, and deburring, for example. The workcell 5 is not limited to robotic processes to be performed on the vehicle body 10, but instead may include work pieces of varying dimensions, shapes, and orientations, depending on the application. Furthermore, the graphical representation of the workcell 5 may also include graphical representations of any peripheral objects (not shown) that may interfere with the operation of the robots 20 or the placement of any work pieces.

The 3-D graphical representation of the workcell 5 is produced by a software application configured to simulate a robotic process to be carried out at a work site. Any reference made hereinafter to the workcell 5 refers specifically to the 3-D graphical representation of the workcell 5, and not to the actual physical work site being simulated by the software application. The software application simulates the size, position, and orientation of any work pieces, peripheral objects, and robots contained within the workcell 5. The 3-D graphical representations of the work pieces, peripheral objects, and robots may be imported to the software application from an external CAD system, for example.

The software application is further configured to simulate the robotic processes performed by the plurality of robots 20 contained within the workcell 5. Data regarding the robotic processes may be imported to the software application from at least one external system. For example, the software application may import data from a memory of a plurality of robot controllers (not shown) located at the work site, or, alternatively, the software application may import the data from another external memory source that has gathered and configured the data for 3-D graphical representation. Because a work site often includes multiple robots being controlled by multiple robot controllers, the software application is configured to combine data from multiple robot controllers to simulate all of the processes to be performed by the plurality of robots 20 within the workcell 5.

The software application is an off-line software application, meaning that the software application is not being used to make real-time adjustments to the actual robot controllers and robots while they are performing a robotic process at the actual work site. As described hereinabove, the software application may be configured to initially import all data relevant to simulating the workcell 5 from external data storage devices, including the memory of the robot controllers and any form of data storage used by other software that may be working in conjunction with the software application. The importing of relevant data may aid the operation of the software application by reducing a volume of data to be computed by a processor associated with the software application. This feature allows many aspects of the simulation to be pre-computed, which may significantly reduce a time needed to carry out certain computations associated with the software application.

The 3-D graphical representation of the workcell 5 shown in FIG. 1 is displayed to a user using a 2-D display screen associated with the software application. Accordingly, the 2-D display screen shows a 2-D projection or image of any objects contained within the workcell 5 as the workcell 5 is viewed from different positions and orientations within the 3-D space. A position of a point displayed on the 2-D display screen may be defined with reference to a traditional Cartesian coordinate system having two orthogonal axes, meaning that a position of each point displayed on the 2-D display screen can be defined using two coordinate values relative to a reference point (origin) located on the 2-D display screen.

The software application may include a user interface (UI) configured to allow a user to adjust the position and angle from which the workcell 5 is viewed, causing the 2-D display screen to display different corresponding images of the workcell 5. The UI may include an ability to scroll the view in 2-dimensions, rotate the view, or zoom the view in or out. The view shown on the 2-D display screen may be referred to as a "camera view" of the workcell 5.

Each of the robot controllers used to control at least one of the robots 20 may have many different teaching point (TP) programs stored to a memory thereof or otherwise associated therewith. Each TP program is an operation program that instructs a robot to perform a specified task. For instance, a TP program may instruct an end-effecting tool (not shown) disposed on a robot arm to follow a particular path of movement while also instructing the end-effecting tool when to perform additional functions such as painting, welding, or grasping a work piece, for example. Accordingly, the software application may represent each TP program in the 3-D space as a 3-D path 25 showing the positions and/or orientations of a specified portion of a corresponding robot 20 as the robot 20 performs a robotic process. The 3-D path 25 may include a plurality of nodes 26, also commonly referred to as taught points, placed at various points along the 3-D path 25. Each node 26 may represent a critical point along the 3-D path 25, such as a point where the robot 20 is caused to change a course of motion. Accordingly, each node 26 may contain data referencing its position in the 3-D space relative to the reference point using three coordinate values. Hereinafter, reference to a TP program generated within the 3-D space of the workcell 5 refers to the 3-D path 25 and nodes 26 representing the TP program within the workcell 5.

In many robotic processes, such as the painting process shown in FIG. 1, the robotic process may include the execution of multiple TP programs running on multiple robot controllers. Furthermore, each TP program may include multiple nodes 26 defining the 3-D path 25 associated with each TP program. As such, the 3-D graphical representations of the multiple TP programs generated by the software application may include many 3-D paths 25 and nodes 26 that are closely spaced or overlapping, making selection of a single 3-D path 25 or node 26 from the display difficult to a user of the software application. It is therefore an object of the instant invention to provide a method to easily select a desired TP program for editing from amongst a plurality of the TP programs associated with the workcell 5.

Figure 2:
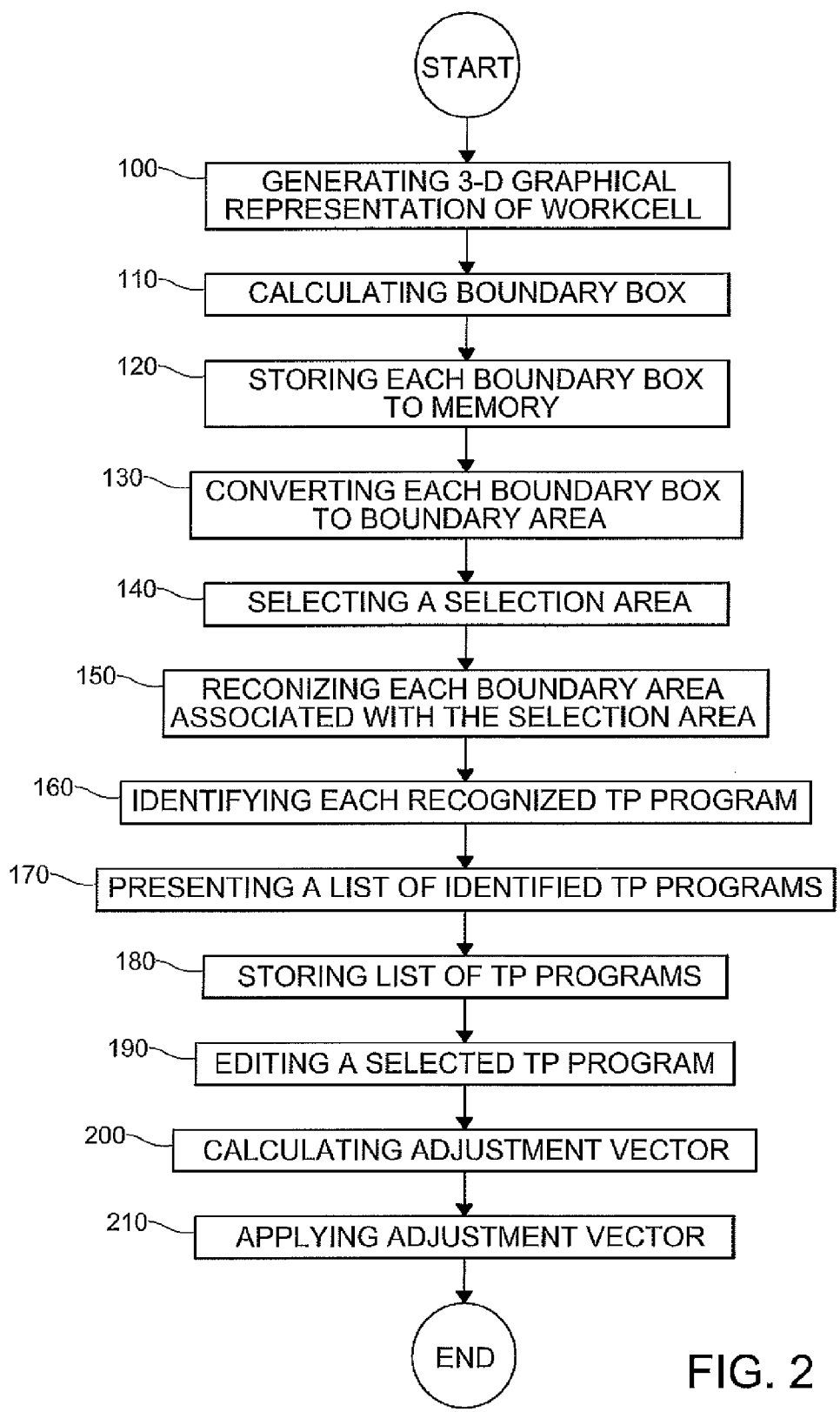
FIG. 2 is a flow chart showing an overall process according to the embodiment of the invention.

FIG. 2 is a flow chart showing a plurality of steps for selecting a desired TP program from within the 3-D graphical representation of the workcell 5. The method according to the invention includes a first step 100 of generating the 3-D graphical representation of the robotic process to be performed in the workcell 5. The generating step 100 includes the generating of all 3-D objects within the workcell 5 as well as the generating the path of each TP program associated with the robotic processes to be carried out within the workcell 5. The generating step 100 may apply to all of the TP programs associated with the workcell 5, regardless of which robot controller is associated with each TP program. The generating step 100 may also include the generating of the 2-D image representing the projection of the 3-D space viewable to a user of the software application on the 2-D display screen. The generating step 100 may further include a step of importing all data needed to generate the 3-D graphical display from all necessary external memory sources.

Figure 3:
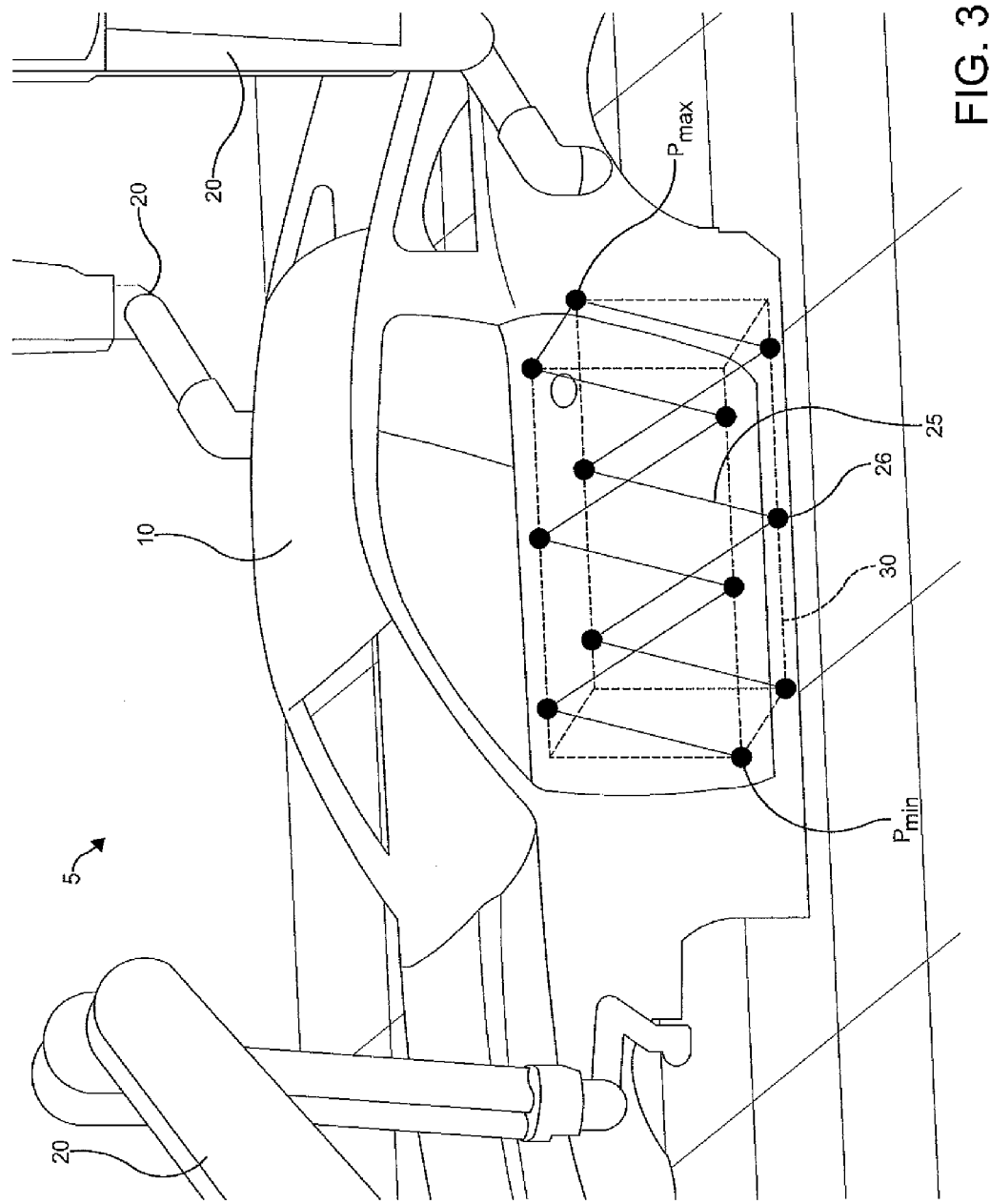
FIG. 3 is a perspective view of the workcell of FIG. 1 further including a representation of a boundary box calculated for an associated TP program.

The method according to the invention also includes a step 110 of calculating a boundary box 30 for each TP program associated with the workcell 5, as shown in FIG. 3. Each boundary box 30 represents a 3-D volume within the 3-D space that fully encompasses every node 26 associated with the TP program for which the boundary box 30 is calculated. The boundary box 30 is calculated by first identifying the 3-D coordinates of each node 26 associated with the TP program relative to a reference point. The coordinate values for each node 26 may be represented as having an "x" value, a "y" value, and a "z" value, which can be represented in the form of (x, y, z). Next, the minimum and maximum values for each of the "x" values, the "y" values, and the "z" values for all of the identified nodes 26 associated with the TP program are determined. Using these determinations, two points, $P_{min}$ and $P_{max}$, can be identified having the coordinates of $(X_{min}, Y_{min}, Z_{min})$ and $(X_{max}, Y_{max}, Z_{max})$, respectively. The points $P_{min}$ and $P_{max}$ represent two opposing corners of the boundary box 30, as shown in FIG. 3. The coordinates of the other six corners of the boundary box may be determined from the coordinates of the points $P_{min}$ and $P_{max}$, and they may be represented as $(X_{max}, Y_{min}, Z_{min})$, $(X_{max}, Y_{max}, Z_{min})$, $(X_{min}, Y_{max}, Z_{min})$, $(X_{min}, Y_{max}, Z_{max})$, $(X_{min}, Y_{min}, Z_{max})$, and $(X_{max}, Y_{min}, Z_{max})$. Accordingly, the eight corners of the boundary box 30 are defined and each node 26 associated with the TP program for which the boundary box 30 was calculated is located within the boundary box 30 or on an outer surface of the boundary box 30.

The method further includes a step 120 of storing each calculated boundary box 30 to a memory or storage device (not shown) associated with the software application. The storing step 120 avoids the need for the software application to continually re-calculate the boundary box 30 for each associated TP program during use of the software application. For instance, each time a user changes the position from which the 3-D space is viewed, the pre-calculated and stored boundary boxes 30 do not need to be recalculated in the 3-D space according to the new viewing position.

Figure 4:
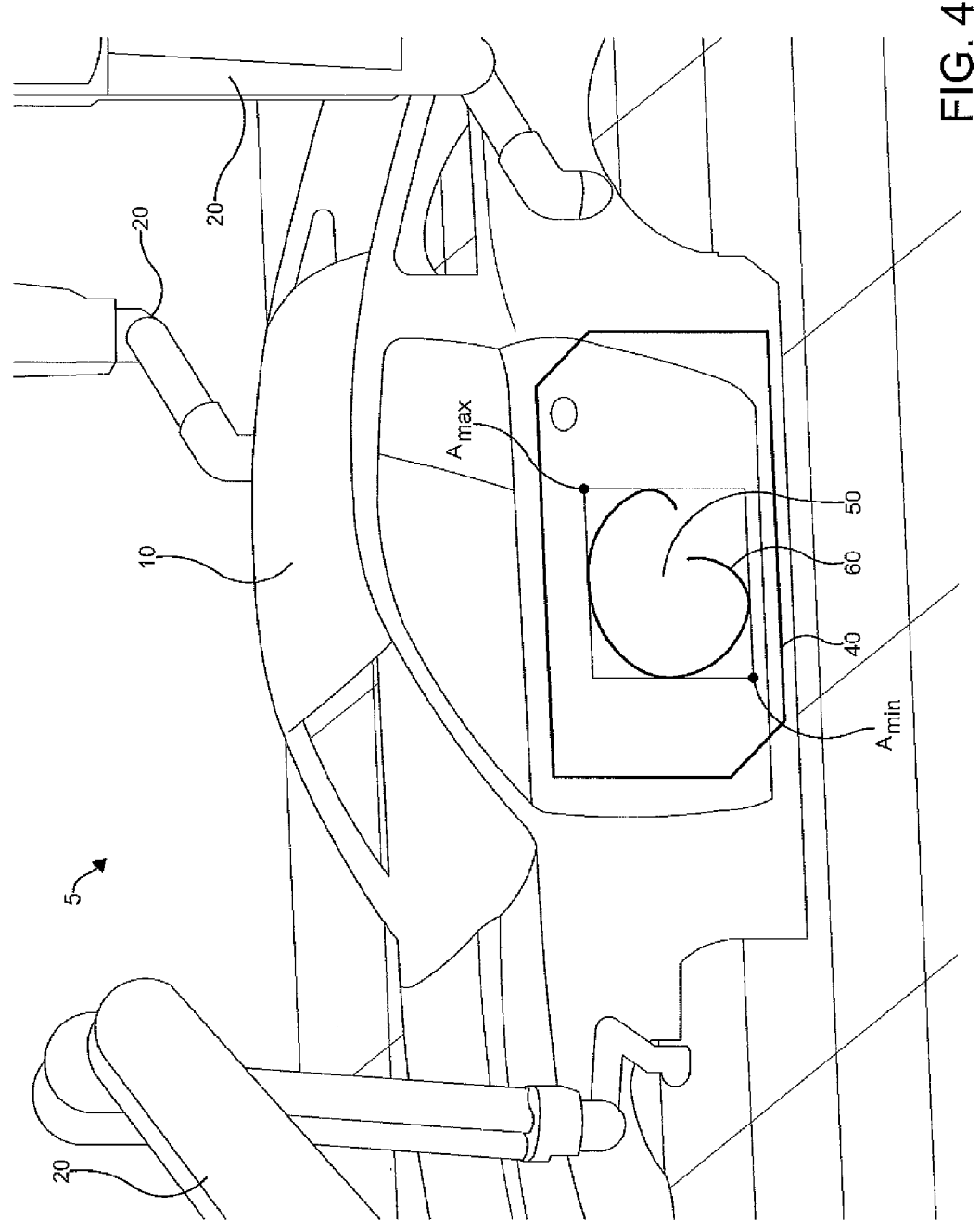
FIG. 4 is a perspective view of the workcell of FIG. 3 showing the converting of the boundary box to a boundary area for an associated TP program as well as the process for selecting a selection area on a 2-D display screen.

The method further includes a step 130 of converting each 3-D boundary box 30 to a 2-D boundary area 40. Each boundary box 30 within the 3-D space may be displayed on the 2-D display screen as a 2-D projection of a 3-D object. While the 3-D representation of the boundary box 30 is a rectangular parallelepiped or cube having six distinct planar surfaces, the 2-D projection appears on the 2-D display screen as a hexagon having six distinct sides, as shown in FIG. 4. The area bounded by the six distinct sides represents the converted boundary area 40. The boundary area 40 may also appear as a four-sided rectangle depending on the angle from which the 3-D boundary box 30 is viewed. Because the boundary area 40 is shown in two dimensions on the 2-D display screen, the boundary area 40 is comprised of a plurality of points having 2-D coordinates relative to a reference point (origin). Accordingly, the coordinate values for each point comprising the boundary area 40 may be represented as having an "x" value and a "y" value, which can be represented in the form of (x, y). Although the boundary area 40 is shown visually in FIG. 4, during normal operation of the software application the boundary areas 40 are not shown to the user on the 2-D display screen as the user navigates the workcell 5 using the UI.

The converting step 130 may take place each time a user changes the position from which the 3-D workcell 5 is viewed. In other words, as a user views the 3-D workcell 5 from different positions (changing the camera view), the 2-D projection of the outer edges of the 3-D boundary box 30 will continually change. Accordingly, the converting step 130 is preferably carried out each time the user changes the position from which the 3-D workcell 5 is viewed.

In order to select a TP program from the 3-D space of the workcell 5, the method according to the invention includes a step 140 of selecting a 2-D selection area 50 from the 2-D screen display. The selection area 50 is a 2-D area superimposed on the 3-D graphical representation of the workcell 5 in similar fashion to the boundary area 40, as explained hereinabove. As shown in FIG. 4, the selecting step 140 may be performed by the user drawing a selection boundary 60 around an area selected by the user. Because the selection boundary 60 is drawn in two dimensions as shown on the 2-D display screen, the selection boundary 60 is formed from a plurality of points having 2-D coordinates relative to a reference point (origin), preferably the same reference point as used in determining the coordinates of the points comprising the boundary area 40. The coordinate values for each point comprising the selection boundary 60 may be represented as having an "x" value and a "y" value, which can be represented in the form of (x, y).

Figure 5:
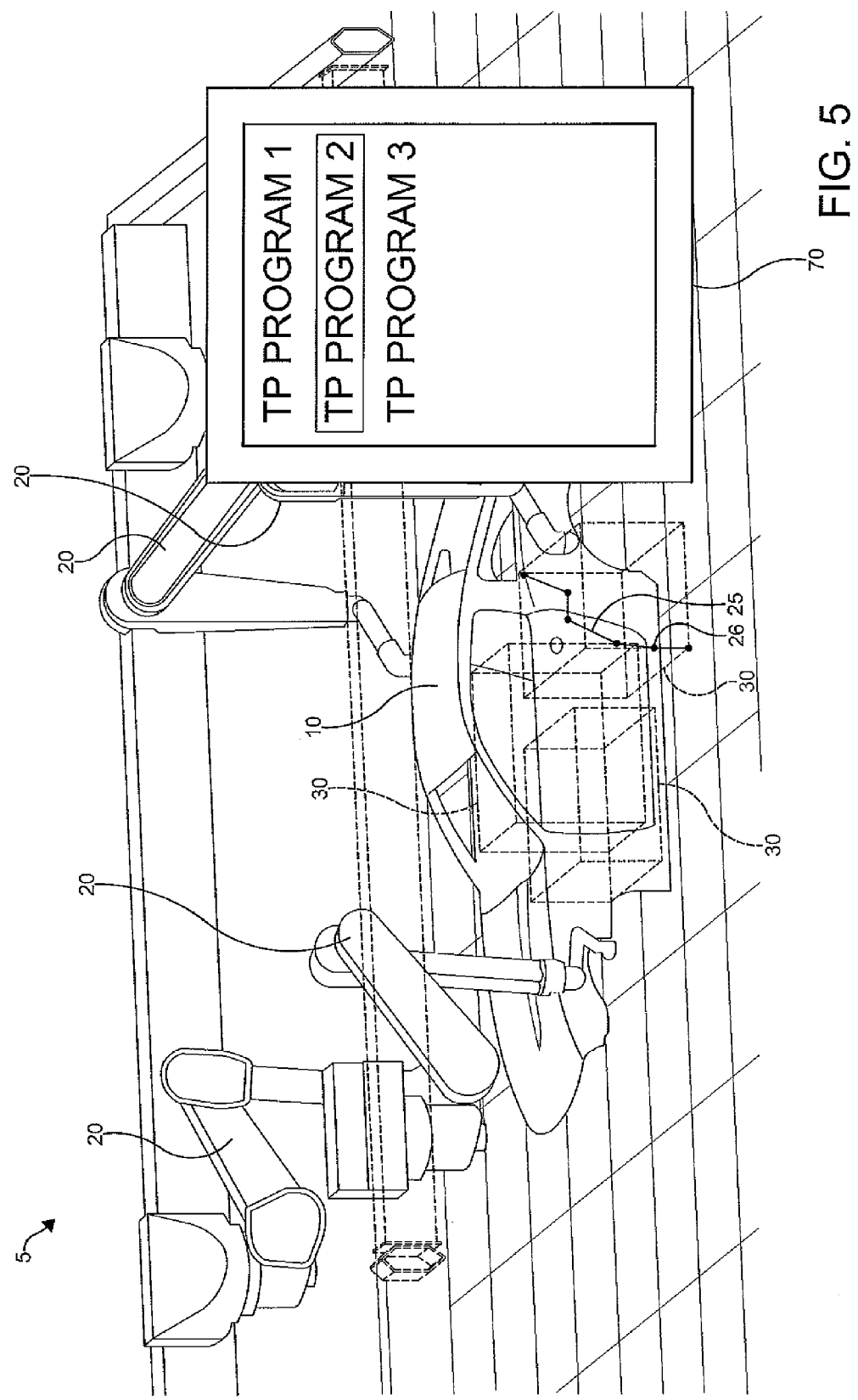
FIG. 5 is a perspective view of a workcell showing the identification and listing of a plurality of TP programs associated with the workcell.

The selection boundary 60 is then converted to the selection area 50. The converting of the selection boundary 60 to the selection area 50 is performed by first identifying the 2-D coordinates for each point comprising the selection boundary 60. Next, the minimum and maximum values for each of the "x" values and each of the "y" values for all of the identified points comprising the selection boundary 60 is determined. Using these determinations, two points, $A_{min}$ and $A_{max}$, can be identified having the coordinates of $(X_{min}, Y_{min})$ and $(X_{max}, Y_{max})$, respectively. The points $A_{min}$ and $A_{max}$ represent diagonally opposite corners of a rectangle, as shown in FIG. 5. Using the coordinates of these two points, the other two points forming the corners of the rectangle can be determined to be the points having the coordinates of $(X_{min}, Y_{max})$ and $(X_{max}, Y_{min})$. Thus, the selection area 50 is the area encompassed by the rectangle formed by these four corner points.

The drawing of the selection boundary 60 may be performed using a cursor presented to a user of the software application on the 2-D display screen associated therewith. However, other known methods of drawing the selection boundary 60 may be used, including drawing the selection boundary 60 using the touch of the user when a touch-screen display screen is used, for example.

Once the selection area 50 is selected, the method according to the invention further includes a step 150 of recognizing each boundary area 40 associated with each TP program that overlaps the selection area 50 or that is within a predetermined distance tolerance of the selection area 50. The recognizing step 150 is performed by comparing the 2-D coordinates of each point associated with the selection area 50 to the 2-D coordinates of each point associated with the boundary area 40, assuming that the 2-D coordinates of each are referenced relative to the same reference point (origin). When the selection area 50 and the boundary area 40 share at least one common point, the selection area 50 and the boundary area 40 may be considered to be overlapping.

The recognizing step 150 may be configured to recognize a boundary area 40 that includes at least a portion of the boundary area 40 within the selection area 50, meaning that at least one point of the selection area 50 overlaps at least one point of the boundary area 40. FIG. 4 shows such a situation, where only a portion of the boundary area 40 overlaps the selection area 50. Alternatively, the recognizing step 150 may be configured to only recognize a boundary area 40 that is included in its entirety within the selection area 50, meaning that all points of the boundary area 40 are shared with the selection area 50. The recognizing step 150 may also recognize a boundary area 40 within a certain distance tolerance relative to an outer boundary of the selection area 50. If no boundary area 40 is recognized as overlapping the selection area 50 or within the distance tolerance of the selection area 50, the method according to the invention may recognize the boundary area 40 located closest to the selection area 50 as shown on the 2-D display screen on which each of the boundary area 40 and the selection area 50 is projected. Furthermore, as described hereinabove, one or more of the boundary areas 40 being recognized may be associated with a different robot controller than one or more other boundary areas 40 being recognized. As such, the selection step 140 and the recognizing step 150 allow for selection of multiple specified TP programs that are associated with different robot controllers.

The method according to the invention further includes a step of identifying 160 each TP program associated with a boundary area 40 that has been recognized as overlapping the selection area 50 or within the predetermined distance tolerance of the selection area 50. As used hereinafter, the term "identifying" refers to the software application visually displaying each identified TP program to a user of the software application. Each TP program associated with a boundary area 40 that has been recognized as overlapping the selection area 50 (or within the predetermined distance tolerance) may be displayed to the user by displaying a single node 26 associated with each identified TP program that is closest to a center of the selection area 50. Alternatively, the identifying step 160 may include displaying the 3-D path 25 associated with each identified TP program in its entirety, including all nodes 26 associated with the 3-D path 25.

If multiple candidate TP programs (which may be running on multiple robot controllers) are recognized and identified, the method according to the invention includes a further step 170 of presenting a dialog box 70 to the user, as shown in FIG. 5. The dialog box 70 preferably lists all of the TP programs recognized and identified as overlapping the selection area 50, regardless of which robot controller with which the TP program is associated. The dialog box 70 may preferably include a feature allowing a user to select one of the listed TP programs from the list to perform further operations with respect to the selected TP program. The presenting step 170 may be configured to only display a graphical representation of the TP program selected by the user from the list presented in the dialog box 70. As shown in FIG. 5, a TP program indicated as "TP program 2" is currently selected and only "TP program 2" is displayed in the form of the 3-D path 25 and the nodes 26. When displaying a graphical representation of the selected TP program, the boundary box 30 encompassing the selected TP program may also be displayed to the user simultaneously with the TP program. Furthermore, the boundary boxes 30 that have been generated for the non-selected TP programs presented in the dialog box 70 may be displayed to the user in the form of empty boundary boxes 30, meaning that the TP programs corresponding to each boundary box 30 are not visually displayed, as shown in FIG. 5 with reference to "TP program 1" and "TP program 3," for example.

If multiple TP programs are recognized and identified and the dialog box 70 is presented to the user, the method according to the invention may further include a step 180 of storing the list of TP programs associated with the dialog box 70 to a memory source or device (not shown). The storing 180 of the list of TP programs may aid the user in referring back to the TP programs within the selection area 50 if the user wishes to choose another TP program for editing from the list provided by the dialog box 70.

Once all of the TP programs within or near the selection area 50 are identified to the user, the user may select one of the TP programs. Once selected, the method according to the invention may further include a step 190 of permitting user editing of at least a portion of the selected TP program, including permitting user editing of any nodes 26 associated with the selected TP program. The user editing may, for instance, include shifting a position of a TP program or an associated node 26 within the 3-D space of the workcell 5. Accordingly, the user editing may include assigning a node 26 being repositioned a new location in 3-D Cartesian space based on a reference point (origin) included within the workcell 5.

If the user does choose to shift or otherwise change a position of a TP program or a node 26 associated with a TP program, the method according to the invention may further include a step 200 of calculating an adjustment vector for each node 26 that is re-positioned. The adjustment vector indicates a magnitude and a direction of the change in position of the node 26 being shifted in the 3-D Cartesian space. Because each TP program is comprised of a plurality of nodes 26, the re-positioning of an entire TP program will include the re-positioning of each node 26 associated with the TP program, hence an adjustment vector is calculated for each node 26 associated with the TP program. The calculation of the adjustment vector lessens a time needed to perform the calculating step 110, the storing step 120, and the converting step 130. This occurs because prior to the re-positioning of a node 26, the software application has preferably already pre-calculated the boundary box 30 and the boundary area 40 for each TP program, both of which are stored to a memory associated with the software application. When a node 26 is re-positioned, the software application is preferably configured to only re-calculate the boundary box 30 and hence the boundary area 40 for the TP program associated with that node 26, rather than recalculating the boundary box 30 and boundary area 40 for each TP program associated with the workcell 5.

Once each adjustment vector has been calculated, the method according to the invention further includes a step 210 of applying each calculated adjustment vector to each corresponding node 26 being re-positioned. Because each node 26 associated with a TP program within the workcell 5 is assigned a set of 3-D coordinates (x, y, z), the applying step 210 of the adjustment vector involves re-assigning coordinate values to each repositioned node 26 based on the adjustment vector calculated for each repositioned node 26. The applying step 210 may include the re-calculating of each boundary box 30 associated with the TP program with which the node 26 being repositioned is associated. The calculating of each boundary box 30 is performed using the reassigned coordinates for each repositioned node 26. Accordingly, the applying step 210 may also include the re-calculating of each boundary area 40 associated with each re-calculated boundary box 30. The applying step 210 may further include re-generating the 3-D graphical representation of the robotic process to be performed within the workcell 5. Once the applying step 210 has been completed, the user may select another selection area 50 based on the re-calculated boundary boxes 30 and boundary areas 40 following the repositioning of the at least node 26 associated with a TP program.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for locating robotic teaching point programs for editing, comprising the steps of:
   generating on a display screen of a robot simulator a 3-D graphical representation of a path of a robotic process to be performed in a workcell, the robot simulator having a user interface;
   permitting a user to select by the user interface a 2-D selection area of the path superimposed on the 3-D graphical representation;
   identifying on the display screen to the user at least one teaching point program associated with the 2-D selection area, the at least one teaching point program being an operation program previously stored to the memory of a robot controller of a robot, or an external memory source, associated with the workcell; and
   permitting the user to edit by the user interface at least a portion of the at least one teaching point program associated with the 2-D selection area.

2. The method according to claim 1, further comprising a step of calculating a 3-D boundary box for each teaching point program associated with the workcell.

3. The method according to claim 2, wherein each boundary box is formed as a rectangular parallelepiped located within the workcell, wherein each boundary box encompasses every node associated with the teaching point program for which the boundary box is calculated.

4. The method according to claim 2, further including a step of storing each 3-D boundary box to a memory source.

5. The method according to claim 2, further comprising a step of converting each of the 3-D boundary boxes to a corresponding 2-D boundary area, wherein each 2-D boundary area is a 2-D projection of the corresponding 3-D boundary box superimposed on the 3-D graphical representation.

6. The method according to claim 5, wherein the converting step is performed when changing a view of the 3-D graphical representation of the workcell presented to the user.

7. The method according to claim 5, further including a step of recognizing each 2-D boundary area that overlaps the 2-D selection area, wherein each teaching point program associated with each 2-D boundary area recognized as overlapping the 2-D selection area is identified to the user as being associated with the 2-D selection area.

8. The method according to claim 5, further including a step of recognizing each 2-D boundary area that is within a distance tolerance of the 2-D selection area, wherein each teaching point program associated with each 2-D boundary area recognized as being within the distance tolerance of the 2-D selection area is identified to the user as being associated with the 2-D selection area.

9. The method according to claim 1, wherein the step of selecting a 2-D selection area includes drawing an outer boundary around an area of the 3-D graphical representation to form the 2-D selection area.

10. The method according to claim 1, further including a step of displaying a list of all identified teaching point programs for viewing by the user.

11. The method according to claim 10, wherein the list is displayed to the user as a dialog box.

12. The method according to claim 1, wherein the step of identifying the at least one teaching point program associated with the 2-D selection area is performed by searching all teaching point programs stored on all robotic controllers associated with the workcell.

13. The method according to claim 1, including a step of providing a user interface enabling the user to interact with the at least one teaching point program associated with the 2-D selection area.

14. The method according to claim 1, wherein the editing of the at least a portion of the at least one teaching point program includes repositioning at least one node associated with the at least one teaching point.

15. The method according to claim 14, further including a step of calculating an adjustment vector for the at least one node, wherein the adjustment vector includes a distance and a direction that the at least one node is to be repositioned, and wherein the adjustment vector is applied to reposition the at least one node.

16. The method according to claim 15, further including a step of calculating a 3-D boundary box for the at least one teaching point program after the adjustment vector has been applied.

17. A method of selecting robotic teaching point programs within a 3-D graphical representation of a workcell, the 3-D graphical representation including a path of a robotic process to be performed in the workcell, comprising the steps of:
  calculating by a robot simulator a 3-D boundary box for each teaching point program associated with the workcell, the robot simulator having a display screen and a user interface;
  converting each of the 3-D boundary boxes to a corresponding 2-D boundary area superimposed on the 3-D graphical representation of the workcell on the display screen of the robot simulator;
  permitting a user to select by the user interface a 2-D selection area superimposed on the 3-D graphical representation;
  recognizing each of the 2-D boundary areas that overlaps the 2-D selection area; and
  identifying on the display screen to the user each of the teaching point programs having a corresponding 2-D boundary area that is recognized as overlapping the 2-D selection area, each of the teaching point programs being an operation program previously stored to the memory of a robot controller of a robot, or an external memory source, associated with the workcell.

18. The method according to claim 17, wherein the converting step is performed when changing a view of the 3-D graphical representation of the workcell.

19. The method according to claim 17, further including a step of displaying a list of all of the identified teaching point programs for viewing by the user.

20. The method according to claim 17, wherein the step of identifying the teaching point programs having a corresponding 2-D boundary area that is recognized as overlapping the 2-D selection area is performed by searching all teaching point programs stored on all robotic controllers associated with the workcell.

* * * * *